June 12, 1951 J. KAUPERT 2,556,427
TURN SIGNALING SWITCH FOR MOTOR VEHICLES
Original Filed April 1, 1947
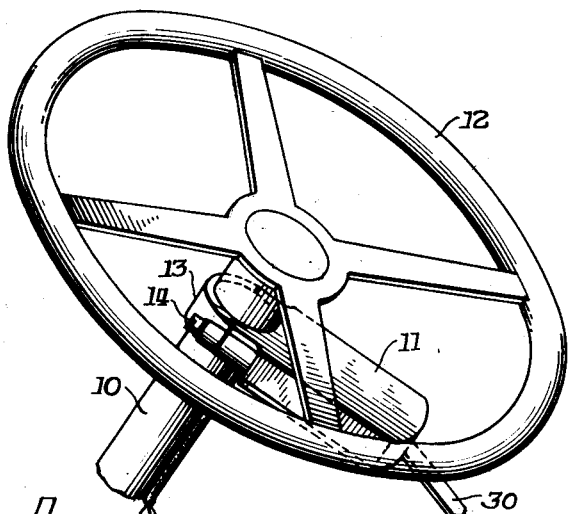
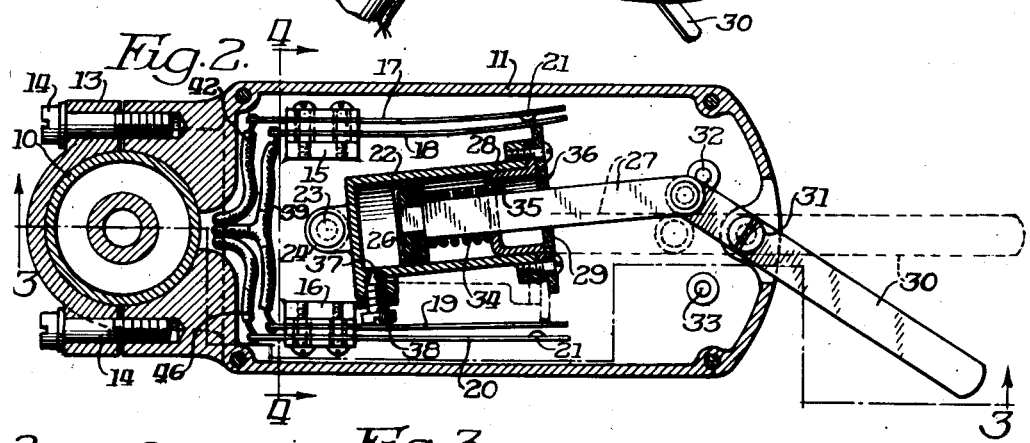
INVENTOR.
Joseph Kaupert,
BY
William H. DeBusk,
Atty.

Patented June 12, 1951

2,556,427

UNITED STATES PATENT OFFICE 2,556,427

TURN SIGNALING SWITCH FOR MOTOR VEHICLES

Joseph Kaupert, Chicago, Ill.

Substituted for application Serial No. 738,631, April 1, 1947. This application March 13, 1950, Serial No. 149,376

2 Claims. (Cl. 200—34)

This application is a substitute of application Serial No. 738,631, filed April 1, 1947, and now abandoned.

This invention relates to signalling devices for vehicles for enabling the driver to indicate in advance a turn of the vehicle toward either the right or the left, and it has for its object the provision of a new and improved form and arrangement of parts in a device of this type, and particularly to provide an improved arrangement whereby the operating parts may be automatically returned to neutral inoperative position by a delayed action for terminating a signal indication following a manual manipulation of the parts for initiating such signal. It is one of the objects of the invention to provide an improved arrangement of this type comprising a lever or handle which may be given a stroke manually toward either side of the vehicle from an intermediate neutral or inoperative position for indicating a turn of the vehicle toward that side, together with means for automatically bringing such lever or handle back to its neutral position by a delayed action following the release of the lever in displaced position.

It is another object of the invention to improve devices of this type in sundry details hereinafter pointed out. The preferred means by which I have accomplished my several objects are illustrated in the accompanying drawing, in which Fig. 1 is a perspective view of the steering column of an automobile provided with the control mechanism of my improved device.

Fig. 2 is a horizontal sectional view on an enlarged scale through the control mechanism of Fig. 1, being substantially a section taken on the line 2—2 of Fig. 3.

Figs. 3 and 4 are sectional views taken substantially at the lines 3—3 and 4—4 respectively, in Fig. 2; and Fig. 5 is a diagrammatic view showing the complete system of cooperating parts by which my objects have been accomplished.

Referring now to the several figures of the drawing, in which corresponding parts are indicated by the same reference characters, 10 indicates the steering column of an automobile, having a supporting member in the form of a casing 11 secured thereon a short distance below the usual steering wheel 12. As shown in Fig. 2, the casing 11 is secured in position on the column 10 by means of a keeper bar 13 tightened in position by means of machine screws 14.

At opposite side portions of the casing 11, two lugs 15 and 16 are provided, having flexible conductor strips 17, 18, 19 and 20 mounted thereon in insulated relationship to each other, the strips 17 and 20 being provided with contact members 21 thereon in position to provide effective electrical connection of said strips 17 and 20 with the strips 18 and 19, respectively, when the strips are displaced outwardly by pressure thereon as shown in connection with the strips 17 and 18 in Fig. 2.

Means is provided in the casing 11 between the two sets of conductor strips for applying pressure selectively on the strips at either side of the casing, or adapted alternatively to stand in a neutral inoperative intermediate position. This means comprises in effect a dash-pot arrangement including a cylinder member 22 pivotally mounted at one end by means of a machine screw 23 passing through an ear 24 on the cylinder into a lug 25 carried by the casing 11. Within the cylinder, there is a piston 26 mounted on the end of a bar 27 which passes through a head member 28 in the form of a cup and a straight plate member 29 of porcelain or other suitable insulation material which extends outwardly a short distance beyond the wall of the cylinder at points opposite to the conductor strips 18 and 19. The outer end of the bar 27 is pivotally connected with the inner end portion of an operating handle or lever 30 pivotally mounted by means of a machine screw 31 on a portion of the casing 11. Pins 32 and 33 serve to limit the swinging movement of the handle or lever 30.

A coiled spring 34 mounted on the bar 27 between the piston 26 and the head member 28 serves by pressure on the piston normally to hold the piston at the limit of its movement toward the adjacent end of the cylinder so as to hold the bar 27 and the lever 30 in alined positions with respect to each other in the positions as indicated by dotted lines in Fig. 2. The spring 34 is of such strength that it acts normally to bring the bar 27 and the lever 30 into alined positions at any time when they are free to move after having been displaced from their normal alinement with each other.

As will be appreciated from an examination of Fig. 2, the piston 26 is arranged for permitting the air in the cylinder freely and easily to pass the piston when the piston is moved toward the head member 28 but for preventing the air from passing the piston when the piston is moved along the cylinder in the opposite direction by the action of the spring 34. Ports 35 and 36 are provided in the head members 28 and 29 for permitting air to enter the cylinder when the piston is moved along the cylinder in the direction away from the head member 28. A drain vent is also provided in the wall of the cylinder 22, comprising a conical port 37 adapted to be closed to an adjustable extent by means of a screw 38 having a tapered end portion fitting into the port. By an adjustment of the screw 38, the rate of escape of air through the port 37 can be controlled for regulating the period of time required for the movement of the piston in the direction away from the head 28 by the spring 34 for bringing the bar 27 and the lever 30 into alinement.

Referring now to Fig. 5, it will be seen that the conductor strips 18 and 19 are connected by electric circuit means 39 with one side of a storage battery 40, the other side of which is connected with a suitable ground at 41. The conductor strip 17 is connected by circuit means 42 with electric lamps 43 mounted on the license plates 44 and 45 of the vehicle at the end portions of the plates disposed toward the left side of the vehicle. The conductor 20 is connected by circuit means 46 with electric lamps 47 mounted on said license plates 44 and 45 at the end portions of such plates disposed toward the right side of the vehicle. It will be noted that all four of the lamps 43 and 47 are also grounded at 48 for completing the several circuits preferably through the frame of the vehicle to the battery 40.

It is believed that the operation of my improved device will be understood without extensive explanation. When the driver of the vehicle is about to turn left, he moves the handle or lever 30 toward the left into the position as shown in solid lines in Fig. 2 for moving the cylinder 22 toward the right, considering that the vehicle is moving forwardly toward the left-hand margin of the drawing as shown in said Fig. 2. This movement of the lever and cylinder serves to press the conductor strips 18 and 17 toward the right into effective electrical engagement with each other, serving to connect the battery 40 with the lamps 43 through the circuit means 39, said conductor strips 18 and 17, the circuit means 42, and the grounds 48 and 41, so as to cause such lamps 43 to be illuminated at the side of the vehicle at the left of the driver.

When the vehicle is to be given a right turn, the driver moves the handle or lever 30 toward the right so as to move the cylinder 22 toward the left for pressing the conductor strips 19 and 20 into effective electrical engagement with each other. This serves to connect the battery 40 with the lamps 47 through the circuit means 39, said conductor strips 19 and 20, the circuit means 46 and the grounds at 48 and 41, so as to cause such lamps 47 to be illuminated at the side of the vehicle at the right of the driver.

With the lever or handle 30 moved manually to the limit of its motion toward either the left or the right and there released, the return movement of the lever under the influence of the spring 34 is controlled by the effective size of the opening through the port 37 as regulated by the adjustment of the screw 38. With the opening between said screw 38 and the wall of the port adjusted to a small size, the escape of the air from the cylinder will be slow and the action of the spring in returning the operating parts to their neutral intermediate positions will be correspondingly delayed. In case the lever 30 should be moved toward the left so as to cause the lamps 43 to be energized and illuminated, and the driver should then realize that he desired to make a right turn rather than a left turn, the lever 30 could be immediately moved to the limit of its motion toward the right so as to disconnect the lamps 43 and effect the desired connection through the lamps 47, the operation after such procedure being the same as if the lever had been moved toward the right initially.

While I prefer to employ the form and arrangement of parts as shown by the drawing and as above described, the invention is not to be limited to such form and arrangement except so far as the same may be specifically claimed, it being understood that changes might well be made in the arrangement without departing from the spirit of the invention.

I claim:

1. In a switching device for vehicle signalling arrangements, the combination of a supporting base, a dash-pot cylinder swingingly mounted on said base, so as to be movable transversely thereon, and having an outlet port opening therefrom, a piston slidably mounted in said cylinder adapted upon a stroke in one direction to force air out through said outlet port, adjustable means for controlling the escape of air through said outlet port and adapted thus to regulate said stroke of said piston, a bar connected with said piston, a second bar pivotally mounted at an intermediate point on said base and pivotally connected at one end portion with said first-named bar, yielding means normally pressing said piston in the direction for forcing air outwardly through said outlet port and serving by its action normally to hold said bars in alined position with respect to each other with the cylinder in an intermediate centered position, and two electric switch devices at opposite sides of said cylinder both adapted to remain open when the cylinder is in its centered intermediate position and adapted to be closed alternatively by movement of the cylinder toward one side or the other.

2. A switching device as specified by claim 1, in which the switch at each side of the cylinder comprises two flexible conductor strips adapted when the cylinder is in its centered intermediate position to stand in spaced relationship to each other with the switch open, and adapted when the cylinder is given an operative stroke laterally toward that switch to be brought into operative engagement with each other for closing the switch.

JOSEPH KAUPERT.

No references cited.